United States Patent
Kim et al.

(10) Patent No.: US 8,581,529 B2
(45) Date of Patent: Nov. 12, 2013

(54) VIBRATION MOTOR DRIVING APPARATUS USING A SERIAL INTERFACE

(75) Inventors: Jeong Cheol Kim, Seoul (KR); Kwang Su Han, Suwon-si (KR)

(73) Assignee: Imagis Technology Limited Company, Gyeonggi-Do (KR)

(*) Notice: Subject to any disclaimer, the term of this patent is extended or adjusted under 35 U.S.C. 154(b) by 271 days.

(21) Appl. No.: 13/124,731

(22) PCT Filed: Oct. 22, 2009

(86) PCT No.: PCT/KR2009/006129
§ 371 (c)(1),
(2), (4) Date: Apr. 18, 2011

(87) PCT Pub. No.: WO2010/047547
PCT Pub. Date: Apr. 29, 2010

(65) Prior Publication Data
US 2011/0204830 A1    Aug. 25, 2011

(51) Int. Cl.
*H02P 31/00* (2006.01)
*H02P 25/02* (2006.01)

(52) U.S. Cl.
CPC .............................. *H02P 25/027* (2013.01)
USPC .......................... 318/114; 318/116; 318/128

(58) Field of Classification Search
CPC ............................................. H02P 25/027
USPC ............................... 318/114, 116, 128
See application file for complete search history.

(56) References Cited

U.S. PATENT DOCUMENTS

| 5,359,268 A | 10/1994 | Kashiyama |
| 5,500,578 A * | 3/1996 | Kawamura ............ 318/116 |

FOREIGN PATENT DOCUMENTS

| KR | 1019990088666 | 12/1999 |
| KR | 1020000041987 | 7/2000 |
| KR | 1020060117400 | 11/2005 |
| KR | 1020070071161 | 7/2007 |

* cited by examiner

*Primary Examiner* — Bentsu Ro
*Assistant Examiner* — David Luo
(74) *Attorney, Agent, or Firm* — IPLA P.A.; James E. Bame (57) ABSTRACT

A vibration motor driving apparatus using a serial interface comprises a serial interface part for receiving an effect command (effect digital data or effect generating command digital data) from a main processor upon occurrence of an event, a unit for generating a clock when the effect command is received from the serial interface unit, a vibration motor driving signal generating unit including an effect data generating part for outputting effect data having a resonance frequency of a vibration motor on the basis of the effect command received from the serial interface unit and the clock received from the clock generating unit, and a D/A converting part for converting the effect data into a vibration motor driving signal, and the vibration motor which vibrates in accordance with the vibration motor driving signal to generate a haptic rhythm.

5 Claims, 5 Drawing Sheets

VIBRATION MOTOR DRIVING APPARATUS USING A SERIAL INTERFACE

BACKGROUND OF THE INVENTION

The present invention relates to a vibration motor driving apparatus that generates haptic rhythms using a vibration motor. More particularly, the present invention relates to a vibration motor driving apparatus that it uses a serial interface without the existing PWM controller to generate various resonance frequencies in case of an event, use various types of vibration motors by controlling resonance frequency to operator vibration motor, improve the pulse capacity by precisely adjusting resonance frequencies, and control the operation and amplitude of vibration motor accurately and precisely. Therefore, it can be applied to all electronic devices that use vibration motors to generate various haptic rhythms, such as mobile devices.

Recently, haptic phones and electronic devices have been released to gain popularity among users. The haptic devices are equipped with haptic functions to generate various haptic rhythms for distinguish and maximize the effects of UI (User Interface) that simply used vibration, ring, or LED lights in case of certain events (pressing buttons or playing games).

Figure 1:
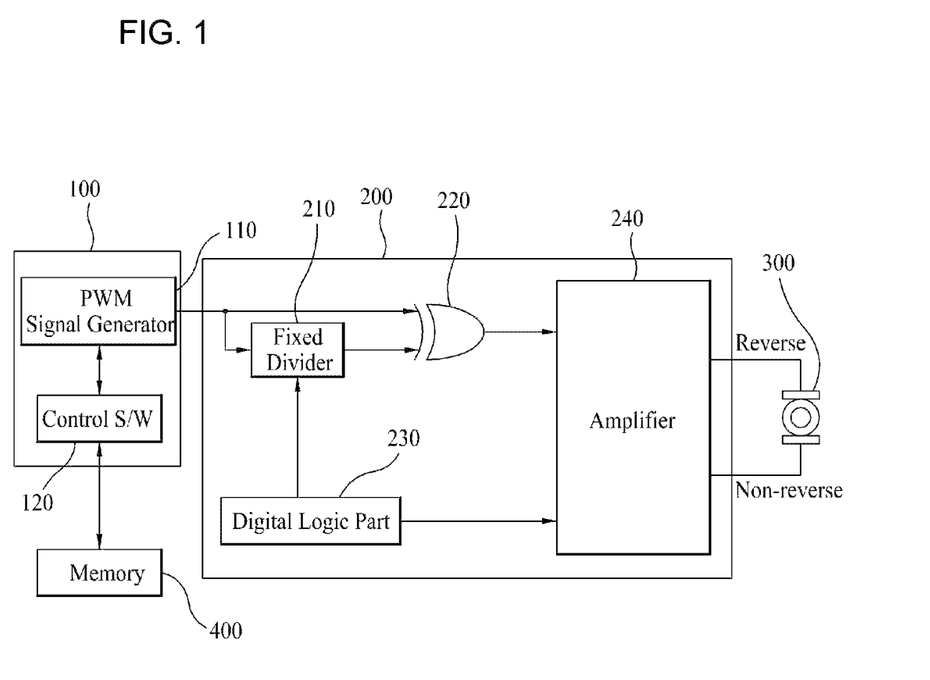
FIG. 1 is a block diagram of a configuration of a vibration motor driving apparatus using a conventional PWM control method.

The present invention relates to the operation and control of a vibration motor driving apparatus that operates the vibration motor for haptic functions. FIG. 1 illustrates a block diagram of a conventional vibration motor driving apparatus.

As shown in FIG. 1, a conventional vibration motor driving apparatus 200 receives PWM signals from the main processor 100, uses a fixed divider 210 and XOR (Exclusive Or Gate: 220) to divide the PWM frequencies entered, and amplifies them into reverse and non-reverse signals through an integrator using the capacitor inside an amplifier 240 to output the actual waveform to operate the vibration motor 300.

However, this type of vibration motor driving apparatus can only generate a fixed resonance frequency to operate AC-type vibration motors (LRA motor, etc) by processing the PWM signals through the fixed divider 210, XOR 220, and the integrator inside amplifier 240, and cannot use the vibration motors using various resonance frequencies.

In particular, PWM type requires the clock frequency of the main processor 100 to match the resonance frequency of the vibration motor 300, but it is difficult to equalize them as each type of vibration motor has different resonance frequencies.

Furthermore, the vibration motor designed to have a consistent resonance frequency may generate slightly different resonance frequency due to inconsistencies in the manufacture process. Thus, the improvement of the pulse capacity of the vibration motors has been limited as a precise adjustment of the resonance frequency considering the offset of each vibration motor has been impossible.

It is also difficult to provide the accurate and precise amplitude control to operate the AC motor (LRA motor) and DC motor (ERM motor) to convert PWM duties into the amplitude that decides the strength of pulse of vibration motor.

As the main processor 100 needs to output the PWM signals, the processor 100 is required to have PWM functions. The processors without the PWM signal output function cannot use this type of operator or require many additional peripheral circuits to operate the vibration motor driving apparatus.

SUMMARY OF THE INVENTION

The present invention was designed to solve the aforementioned problems. An object of this invention is to control the resonance frequency of vibration motor to use one vibration motor driving apparatus to use vibration motors generating various resonance frequencies.

Another object of the present invention is to adjust the original resonance frequency of the vibration motor to improve its pulse capacity and to use a D/A converter to generate its operating amplitude for more accurate and precise control of the vibration motor.

Further another object of the present invention is to control the vibration motor driving apparatus through serial interface to be able to use the vibration motor driving apparatus in a processor without a PWM module to generate various haptic rhythms and significantly reduce the load on main processor, while minimizing the amount of control signals for generating the effect received from the main processor by generating a certain effect waveform in the hardware of the vibration motor driving apparatus without continuous effect digital processor that indicates the amplitude value when an effect generating command data with the additional information of pulse signal, such as waveform and period, are received from serial interface.

In accordance with the present invention to achieve the objects thereof, there is provided a vibration motor driving apparatus using a serial interface comprising: a serial interface part for receiving effect command, which is effect digital data or effect generating command data, in the form of serial data from main processor in case of an event; a clock generator that generates a clock when the effect command is received from the serial interface; a vibration motor driving signal generator having an effect data generator that outputs an effect data with the resonance frequency of the vibration motor based on the effect command received from the serial interface and the clock received from the clock generator and a D/A converter that converts the effect data into a vibration motor driving signal; and a vibration motor that vibrates according to the vibration motor driving signal to generate haptic rhythms.

Here, the effect digital data is an amplitude of the vibration motor when the effect command is the effect digital data and the effect data generator comprises: a digital logic part having a resonance frequency register that stores the clock value or resonance frequency value to control the resonance frequency of the vibration motor, a motor type register that stores the information of the type of the vibration motor, and an operation control register that temporarily stores the amplitude value for an immediate output when the vibration motor has DC motor and every half period of resonance frequency when the vibration motor has AC motor; and a counter and comparator that extracts the resonance frequency information of vibration motor from the resonance frequency register and counts the clock from the clock generator to output the high and low values alternately to the operation control register every time the clock value becomes ½ of the number of clock for the resonance frequency of the vibration motor.

Also, the main processor sets the information of a motor type and the resonance frequency of the vibration motor, which are initially connected to it, on the motor type register and the resonance frequency register.

Moreover, when the effect command is the effect generating command data, the effect generating command data contains one or more of waveform information, period information, and additional information.

Furthermore, the effect data generator comprises: a waveform data generator that generates waveform data corresponding to the information contained in the effect generating command data; a counter and comparator that compares the resonance frequency of the vibration motor with a number of the clock value counted from the clock inputted from the clock generator and outputs high and low values alternately every time the clock value becomes ½ of the number of clock for the resonance frequency of vibration motor to generate pulse waves that have the same frequency with the resonance frequency of the vibration motor; and a modulation part that is connected to the counter and comparator and the waveform data generator to modulate the waveform data outputted from waveform data generator into effect digital data through the pulse waves applied from the counter and comparator and outputs them through the D/A converter.

The present invention as described above has advantageous effects in that, one vibration motor driving apparatus can be used to operate vibration motors in various resonance frequencies as the resonance frequency of vibration motor can be controlled, improve the pulse capacity by precisely adjusting resonance frequencies, and control the operation and amplitude of vibration motor accurately and precisely to improve the haptic rhythms of product.

Also, the vibration motor driving apparatus is controlled by digital values of the serial interface to apply the Haptic function to any main processor without the PWM signal output function. Therefore, haptic rhythms can be created on more various types of system environment and more various vibration motors can be used for the convenience of developers.

Moreover, when additional data containing waveform, amplitude, period, and other information are received to generate a certain effect waveform in the vibration motor driving apparatus, it is possible to generate various haptic rhythms while minimizing the amount of control signals received, thus significantly reducing the load on the main processor.

BRIEF DESCRIPTION OF THE DRAWINGS

The foregoing and other objects, features and advantages of the present invention will become more, apparent from the following detailed description when taken in conjunction with the accompanying drawings in which.

DESCRIPTIONS ON REFERENCE NUMBERS FOR THE MAJOR COMPONENTS IN THE DRAWINGS

10: Main Processor
11: Serial interface
12: Control S/W
20: Vibration motor driving apparatus
21: Serial interface
23: Clock Generator
25: Vibration motor Driving signal Generator
27: Amplifier 30: Vibration motor
40: Memory
50: Effect Data Generator
60: D/A Converter
70: Digital Logic
71: Operation Control Register
73: Motor Type Register
75: Resonance Frequency Register
80: Counter and comparator
90: Waveform Data Generator
95: Modulation part

DETAILED DESCRIPTION OF THE INVENTION

Hereinafter, exemplary embodiments of the present invention will be described in detail with reference to the accompanying drawings.

Figure 2:
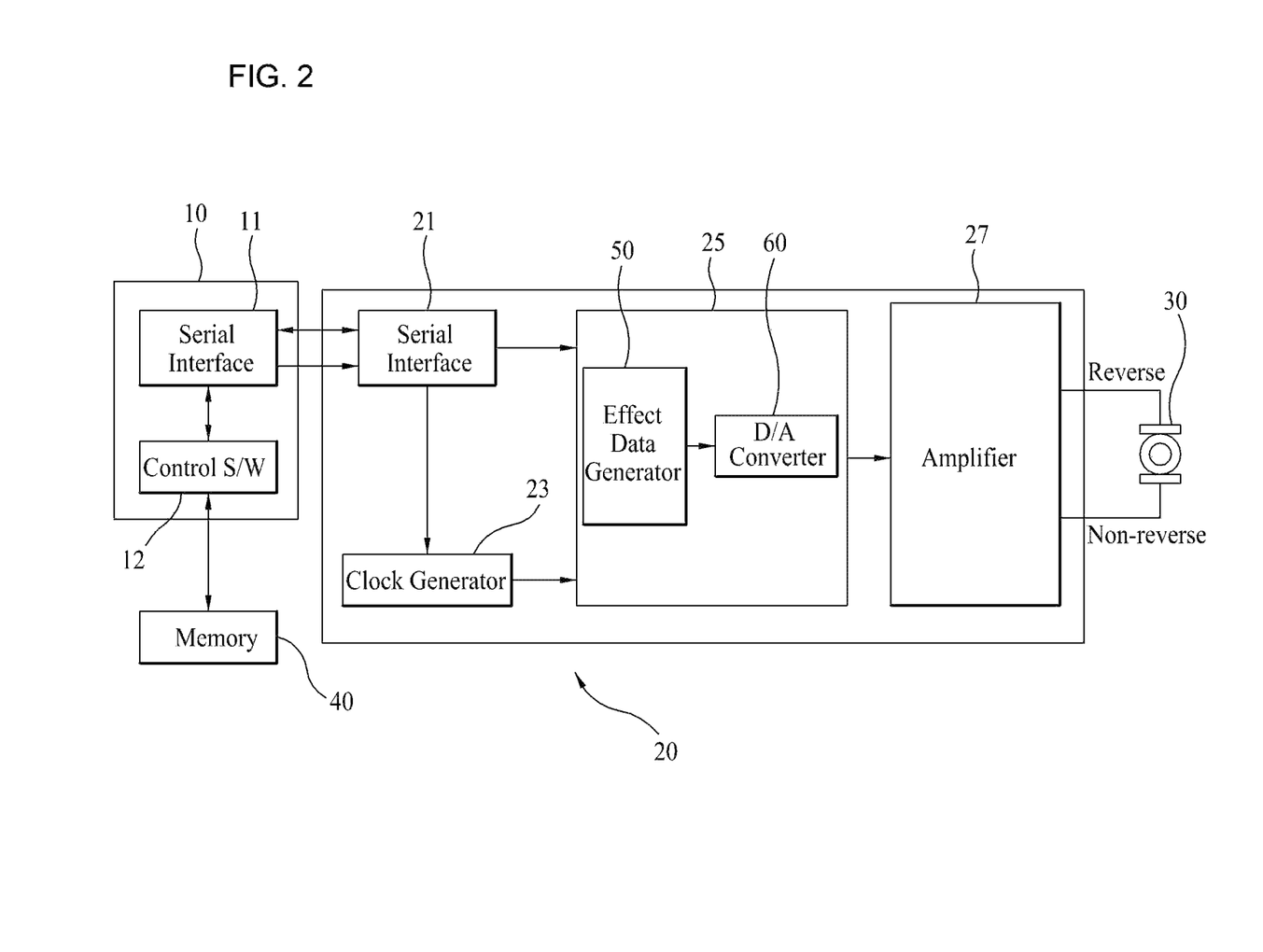
FIG. 2 is a block diagram of a configuration of a vibration motor driving apparatus using a serial interface of the present invention.

FIG. 2 shows a block diagram of the configuration of the vibration motor driving apparatus with serial interface.

As shown in FIG. 2, the vibration motor driving apparatus 2 with serial interface is placed in between a main processor 10 and a vibration motor 30.

The Main processor 10 transmits an effect command (effect digital data or effect generating command data) to vibration motor driving apparatus 200 in case of an event for generating an effect (tactile rhythm of vibration motor). As it uses a serial interface part 21, such as I2C, instead of PWM signals, it can be used with processors without a PWM module. If the effect command is effect digital data, it is the actual digital value indicating the amplitude of the vibration motor 30; if the effect command is an effect generating command data, it may contain additional information, such as the waveform or period, of driving signals of vibration motor 30.

Figure 3:
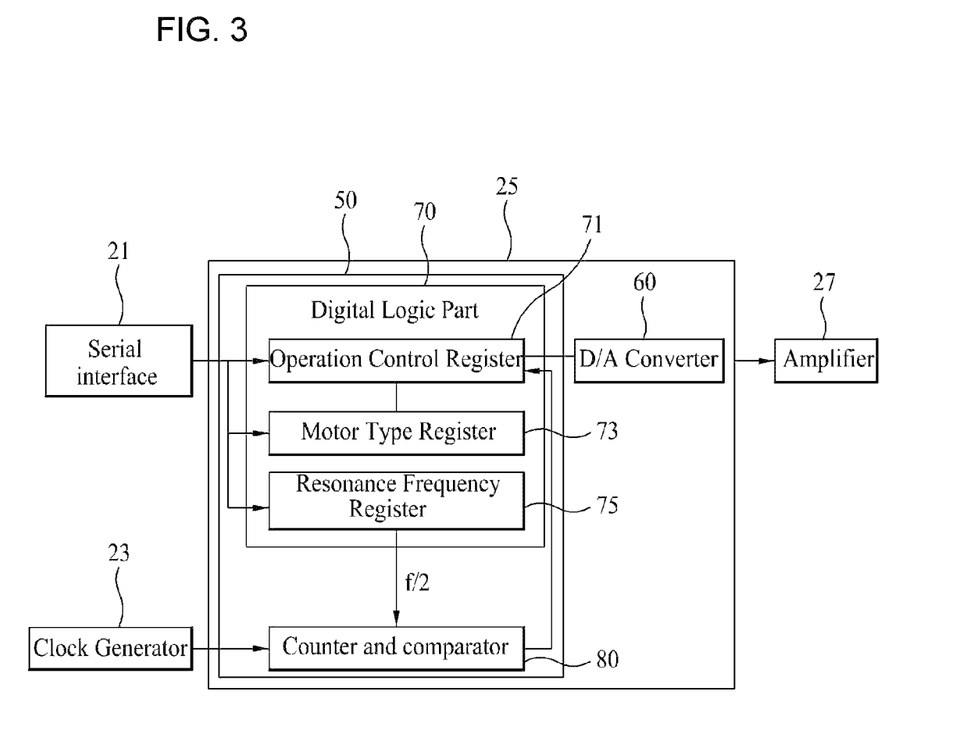
FIG. 3 is a detailed block diagram illustrating an example of effect data generator.
Figure 4:
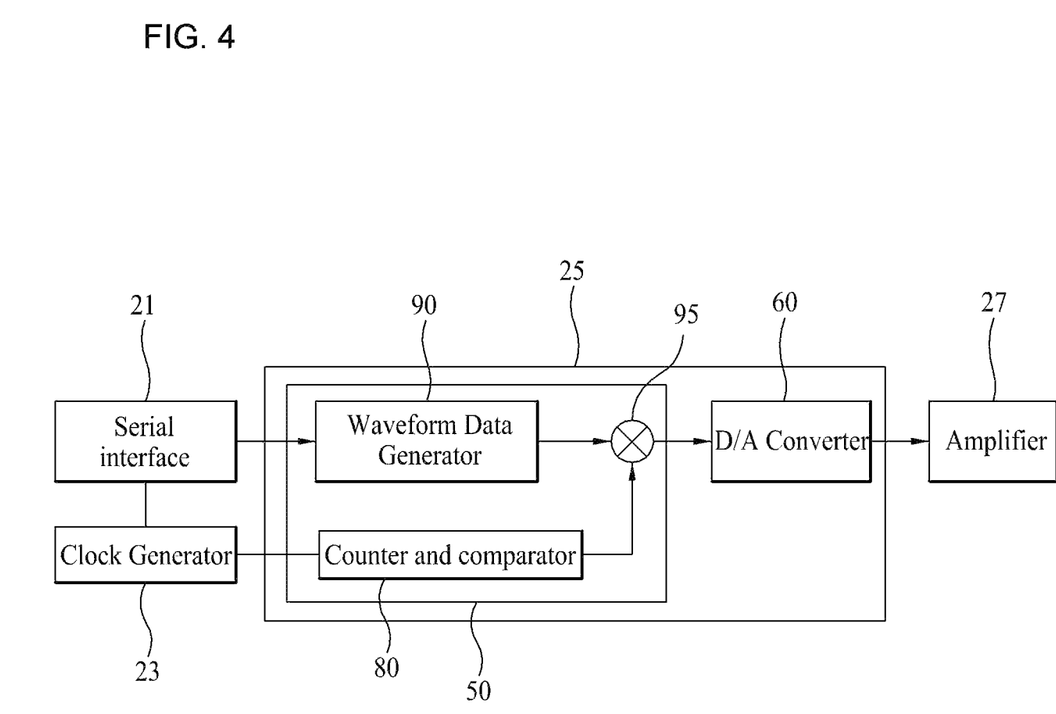
FIG. 4 is a detailed block diagram illustrating another example of effect data generator.

The former will be further described in FIG. 3 and the latter in FIG. 4.

The vibration motor driving apparatus 20 generates vibration motor driving signals for the vibration motor 30 once it receives the effect command (effect digital data or effect generating command) from a serial interface 21 through the main processor 10. The vibration motor driving apparatus 20 includes a serial interface 21, a clock generator 23, a vibration motor driving signal generator 25, and an amplifier 27.

The serial interface 21 receives serial data from the main processor 10. I2C was used in this example, but any type of serial interface can be used as long as it can receive digital data.

The clock generator 23 outputs a standard clock for internal operation and to generate resonance frequencies for the vibration motor 30, and its variability should be maximized to make it possible to control the frequency of clock output. FIGS. 3 and 4 will describe the generation of vibration motor driving signals using the clock from the clock generator 23 in further detail.

The vibration motor driving signal generator 25 includes an effect data generator 50 that outputs the effect data with the resonance frequency of the vibration motor 30 based on the effect command (effect digital data or effect generating command data) from the serial interface 21 and the clock received from the clock generator 23 and a D/A converter 60 that converts the effect data into vibration motor driving signals. Detailed configuration of the effect data generator 50 will be further described by FIGS. 3 and 4.

The amplifier 27 amplifies the converted analog signals for an output through the vibration motor 30 and the vibration motor 30 receives the output from amplifier 27 to generate the haptic rhythms that correspond to the effect command of the main processor 10 or the effect data of the effect data generator 50.

FIG. 3 is a detailed block diagram illustrating an example of effect data generator. In the example of FIG. 3, the effect data are the actual digital values indicating the amplitude of the vibration motor 30 and the effect data generator outputs the digital values of the effect command received in digital values that fit the type of vibration motor or the waveform of resonance frequency.

As illustrated in FIG. 3, the effect data generator 50 can include a digital logic part 70 and a counter and comparator 80.

The digital logic part 70 includes a motor type register 73 that stores the information of the type of the vibration motor 30, a resonance frequency register 75 that stores the clock value or resonance frequency value for controlling the resonance frequency of the vibration motor 30, and an operation control register 71 that outputs effect digital data, or the amplitude value, to the D/A converter 60 according to the output signal from the motor type register or the counter and comparator 80 described below.

The motor type register 73 stores the information of the type of the vibration motor 30, which indicates whether the type of the vibration motor 30 is AC motor or DC motor.

The resonance frequency register 75 stores the clock value or the resonance frequency value to control the resonance frequency. The resonance frequency value can be set at the original resonance frequency of the vibration motor 30 or the original resonance frequency can be adjusted (+/−) appropriately to alter vibration characteristics.

The operation control register 71 temporarily stores the amplitude value received when the effect command is the effect digital data. Then, it immediately outputs the amplitude value when the type of the vibration motor 30 is DC motor or outputs the high or low amplitude value at every ½ period of resonance frequency of the vibration motor 30 based on the output signal from the counter and comparator 80 when the type of the vibration motor is the AC motor.

The counter and comparator 80 reads the resonance frequency information of the vibration motor 30 from the resonance frequency register 75 and counts the clock from the clock generator 23 to output the high and low clock value alternately at every ½ period of resonance frequency of the vibration motor 30 through the resonance frequency register 75.

The operation of vibration motor driving apparatus that generates the haptic rhythms using the vibration motor is further described below referring to FIG. 2 and FIG. 3.

When the system is powered on (or reset), the main processor 10 sets the registers in the vibration motor driving apparatus through the serial interface, such as I2C, with the necessary values, such as the type of vibration motor (ERM or LRA) and the resonance frequency of vibration motor. At this time, the value set on the resonance frequency register 75 can be the original resonance frequency of the vibration motor or resonance frequency adjusted (+/−) appropriately to alter vibration characteristics.

After initial setting, the main processor delivers the effect digital data of the effect command indicating the amplitude value of an effect to the vibration motor driving apparatus 20 through the serial interface, such as I2C, in case of certain events (pressing buttons or playing games) to generate the effect (tactile rhythm of vibration motor).

The vibration motor driving apparatus 20 receives this amplitude value through the serial interface 21, such as I2C, and delivers it to the vibration motor driving signal generator 25.

The digital logic part 70 delivers the received amplitude value to the D/A converter 60 when the type of the vibration motor is set at an ERM type (DC motor) during initial operation, to convert the digital data into an analog data, which is then converted into a DC waveform through the amplifier 27 to operate the vibration motor 30.

The digital logic part 70, when the type of the vibration motor is set at a LRA type (AC motor) during initial operation, uses the counter and comparator 80 to tabulate the clock input from the clock generator 23 and compare it with the clock value (or resonance frequency value) saved on the resonance frequency register 75. If the tabulated number of the clock is smaller than or equal to ½ of the number of the clock for resonance frequency (the point where (+)(−) of signal changes), it outputs the high (low) value through the operation control register 71; if it is larger than ½ of the number of clock for resonance frequency, it outputs the low (high) value through the operation control register 71 to generate the resonance frequency signal of AC motor.

Then, the effect digital data and the amplitude value received from the main processor 10 according to the high or low value, are delivered to the D/A converter 60 accordingly to convert the digital data into the analog data, which is then converted into DC waveform through the amplifier 27 to operate the vibration motor 30.

In this case, if the clock value tabulated at the counter and comparator 80 matches the number of the clock in a period of resonance frequency, the counter and comparator 80 starts tabulating again from 0 and repeats doing so until the vibration motor driving apparatus stops.

The vibration motor 300 vibrates according to the vibration motor driving signal delivered from the vibration motor driving apparatus 200 to generator the haptic rhythms corresponding to the effect digital data from the main processor 100.

According to this example, the effect digital data from the main processor 100 are the digital values indicating the amplitude value and make it possible to control the amplitude value very precisely according to the size of data.

Figure 5:
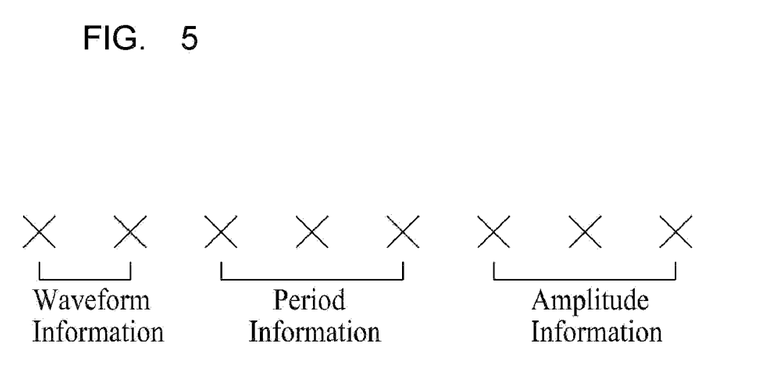
FIG. 5 is an illustration of an example of data structure of effect generating command.
Figure 6:
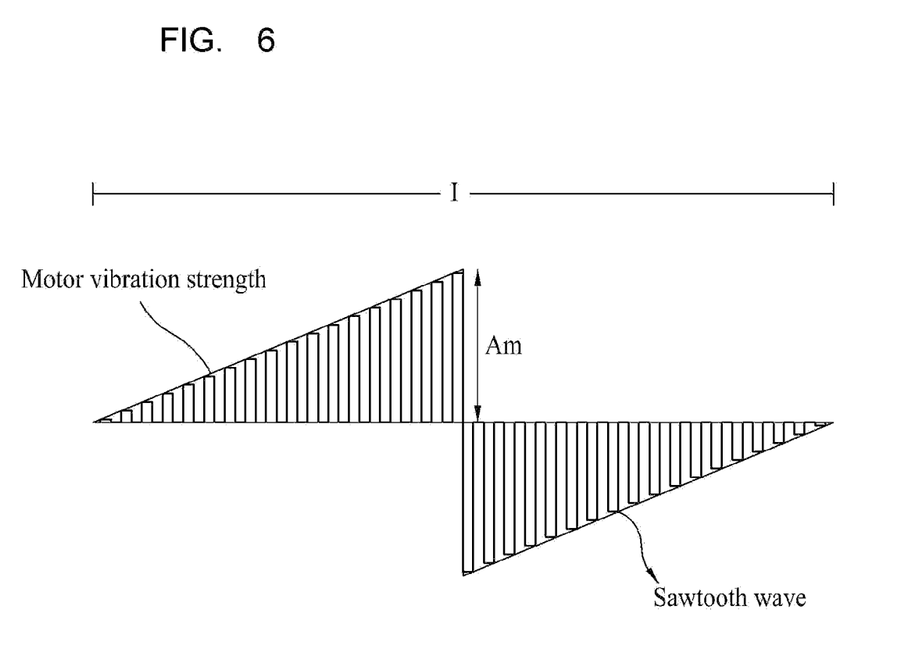
FIG. 6 is an illustration of an example of waveform data generated in the example of FIG. 4.

FIG. 4 is a detailed block diagram illustrating another example of effect data generator. FIG. 5 illustrates a structure of the effect generating command data used in this example and FIG. 6 illustrates a waveform generated in the example of FIG. 4. The example of FIG. 4 has an effect generating command data containing the waveform, frequency, or other information of vibration motor driving signal, and effect data generator generates the waveform of effect digital data that corresponds to the effect generating command data received.

As illustrated in FIG. 4, the effect data generator 50 in this example includes a waveform data generator 90 that generates a waveform data corresponding to the information in the effect generating command data (waveform, period, etc), the counter and comparator 80 that compares the resonance frequency of the vibration motor 30 and the clock value from clock generator and outputs the high and low values alternately every time the clock value becomes ½ of the number of clock for the resonance frequency of the vibration motor 30 to generate pulse waves that have the same frequency with the resonance frequency of vibration motor, and a modulation part 95 that is connected to the waveform data generator 90 and the counter and comparator 80 to modulate the waveform data from waveform data generator into the effect digital data through the pulse waves from the counter and comparator 80 and outputs them through the D/A converter.

Although it is not illustrated in FIG. 4, it is desirable to place registers 71, 83 and 85 for the functions described in FIG. 3 on the inside or back of the waveform data generator 90 and in this case, the operation control register 71 temporarily stores the amplitude value of the effect waveform already configured in the hardware when effect command is effect generating command data.

FIG. 5 is an example of effect generating command data in 8 bits. For example, the upper 2 bits can indicate waveform, the middle 3 bits can indicate period, and the lower 3 bits can indicate additional information. Although it does not show in the illustration, the waveform data generator 90 is required to have data parsing part that divides effect generating command data to each information segment and an embedded hardware circuit to generate waveform data with a certain waveform, period, or additional information according to each value of bit.

For example, it can be set that the upper 2 bits indicate sine wave when it is 00, triangular wave when it is 01, sawtooth wave when it is 10, and spherical wave when it is 11, so that the waveform data generator 90 generates the waveform according to the value of upper 2 bits.

This principle also applies to the middle 3 bits and the lower 3 bits and the periods and additional functions can be classified into 8 cases to generate waveform data with a certain period and amplitude.

Based on this principle, the waveform in FIG. 6 can be created. In FIG. 6, the bold line indicates the vibration motor driving signals after an analog conversion and the vibration strength of the vibration motor, and the output signals from the waveform data generator 90 indicate the discrete-type waveform data, e.g., a discrete-type waveform in the shape of sawtooth wave with a period T and a maximum amplitude Am.

The following further describes the operation of the vibration motor driving apparatus that generates the haptic rhythms using the vibration motor referring to FIG. 4 and FIG. 5.

First of all, a memory 40 stores the effect command (effect digital data or effect generating command data) value to generate the haptic rhythms corresponding to each event.

In case of certain events (pressing buttons or playing games) to generate the effect (tactile rhythm of vibration motor) during system operation, the main processor 10 reads the effect command (effect digital data or effect generating command data) from the memory 40 and delivers it to the vibration motor driving apparatus 20 through the serial interface, such as I2C.

The vibration motor driving apparatus 20 receives the effect digital data that indicates the amplitude value through the serial interface 21, such as I2C, or effect digital data to control the effect waveform already configured in the hardware to deliver them to the vibration motor driving signal generator 25.

In other words, the waveform data generator 90 analyzes the amplitude value when the effect command received is the effect digital data, the waveform, period, or additional information when the effect command is the effect generating command data to generate the corresponding waveform data. Also, the modulation part 95 modulates the waveform data generated from the waveform data generator 90 into the effect data along with the resonance frequency from the counter and comparator 80 and outputs them through the D/A converter 60.

Since the operation that follows is same as that in the example in FIG. 3, detailed descriptions are omitted here.

According to this example, one vibration motor driving apparatus can be used to operate vibration motors in various resonance frequencies, improve the pulse capacity by precisely adjusting resonance frequencies, control the operation and the amplitude of vibration motor accurately and precisely to improve the rhythmic characteristics of product, and perform the haptic functions without limitation even in the main processor that does not output the PWM signals.

Also, the main processor outputs effect generating command data containing the waveform, the amplitude, the period, and other information only one time to generate a certain effect waveform in the hardware of the vibration motor driving apparatus, making it possible to generate various haptic rhythms while minimizing the amount of control signals received from main processor, thus significantly reducing the load on the main processor.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A vibration motor driving apparatus using a serial interface comprising:
   a serial interface part for receiving a effect command, which is an effect digital data or an effect generating command data, the form of a serial data from a main processor in case of an event;
   a clock generator that generates a clock when the driving signal is received from the serial interface part;
   a vibration motor driving signal generator having an effect data generator that outputs an effect data with a resonance frequency of a vibration motor based on the effect command received from the serial interface part and the clock received from the clock generator and a D/A converter that converts the effect data into a vibration motor driving signal; and
   the vibration motor that vibrates according to the vibration motor driving signal to generate haptic rhythms.

2. The vibration motor driving apparatus as recited in claim 1, wherein the effect digital data is an amplitude of the vibration motor when the effect command is the effect digital data and the effect data generator comprises: a digital logic part having a resonance frequency register that stores the clock count value or resonance frequency value to control the resonance frequency of the vibration motor, a motor type register that stores the information of the type of the vibration motor, and an operation control register that temporarily stores the amplitude value for an immediate output when the vibration motor has a DC motor and every half period of the resonance frequency when the vibration motor has an AC motor; and a counter and comparator that extracts the resonance frequency information of the vibration motor from the resonance frequency register and counts the clock from the clock generator to output the high and low values alternately to the operation control register every time the clock value becomes ½ of the number of the clock for the resonance frequency of the vibration motor.

3. The vibration motor driving apparatus as recited in claim 2, wherein the main processor sets an information of a motor type and the resonance frequency of the vibration motor, which are initially connected to it, on the motor type register and the resonance frequency register.

4. The vibration motor driving apparatus as recited in claim 1, wherein, when the effect command is the effect generating command data, the effect generating command data contains one or more of waveform information, period information, and additional information.

5. The vibration motor driving apparatus as recited in claim 4, wherein, the effect data generator comprises:
- a waveform data generator that generates waveform data corresponding to the information contained in the effect generating command data;
- a counter and comparator that compares the resonance frequency of the vibration motor with a number of the clock value counted from the clock inputted from the clock generator and outputs high and low values alternately every time the clock value becomes ½ of the number of the clock for the resonance frequency of the vibration motor to generate pulse waves that have the same frequency with the resonance frequency of the vibration motor; and
- a modulation part that is connected to the counter and comparator and the waveform data generator to modulate the waveform data outputted from the waveform data generator into the effect digital data through the pulse waves applied from the counter and comparator and outputs them through the D/A converter.

* * * * *